(12) United States Patent
Hartwick (10) Patent No.: US 7,410,141 B2
(45) Date of Patent: Aug. 12, 2008

(54) INDUSTRIAL HANGER FOR METAL FRAMING

(75) Inventor: Sam K. Hartwick, Marsing, ID (US)

(73) Assignee: Illinois Tool Works Inc., Glenview, IL (US)

( * ) Notice: Subject to any disclaimer, the term of this patent is extended or adjusted under 35 U.S.C. 154(b) by 307 days.

(21) Appl. No.: 10/974,043

(22) Filed: Oct. 25, 2004

(65) Prior Publication Data

US 2005/0056757 A1 Mar. 17, 2005

Related U.S. Application Data

(63) Continuation-in-part of application No. 10/641,603, filed on Aug. 15, 2003.

(51) Int. Cl.
*A47H 1/10* (2006.01)
(52) U.S. Cl. .................... 248/317; 52/707; 403/299; 411/289
(58) Field of Classification Search ............ 52/707, 52/706, 710, 704; 403/299, 300, 293, 296, 403/387; 411/389, 84, 85, 401; 248/237, 248/340, 342, 58, 317, 339, 343
See application file for complete search history.

(56) References Cited

U.S. PATENT DOCUMENTS

| | | | | |
|---|---|---|---|---|
| 1,145,385 A | 7/1915 | Marble | ............ | 52/701 |
| 1,155,243 A | 9/1915 | Jordahl | ............ | 52/710 |
| 1,360,200 A | 11/1920 | Dowd | ............ | 411/342 |
| 1,709,288 A * | 4/1929 | Sutherland | ............ | 248/343 |
| 1,837,930 A | 12/1931 | Waite | ............ | 248/58 |
| 1,856,356 A | 5/1932 | Owen | | |
| 1,960,003 A * | 5/1934 | Ford | ............ | 174/62 |
| 2,592,315 A * | 4/1952 | Evans | ............ | 248/333 |

(Continued)

FOREIGN PATENT DOCUMENTS

DE 3625885 A1 * 2/1988

(Continued)

OTHER PUBLICATIONS

UNISTRUT Corporation; UNISTRUT Product Manual; 2002.

(Continued)

*Primary Examiner*—Kimberly T. Wood
(74) *Attorney, Agent, or Firm*—Mark W. Croll; Donald J. Breh; Levenfeld Pearlstein, LLC (57) ABSTRACT

A hanger assembly for attaching to framing. The framing has a first vertical wall and a second vertical wall. The framing also has a top and a bottom. The framing has two bearing surfaces that form a plane that is located between the top of the framing and the bottom of the framing. The two bearing surfaces form a slot that allows access to the interior of the framing. The hanger assembly includes a nut that engages the two bearing surfaces of the framing. The nut has a first thread. The hanger assembly also includes a threaded rod that contains a second thread that engages the first thread. The hanger assembly also includes a coupler that contains a third thread that engages the second thread. The distance between the nut and the coupling changes when the coupling is rotated with respect to the nut.

6 Claims, 12 Drawing Sheets

U.S. PATENT DOCUMENTS

| | | | | |
|---|---|---|---|---|
| 2,632,620 | A | | 3/1953 | Hurley ........................ 248/343 |
| 4,097,015 | A | | 6/1978 | Frishman .................... 248/339 |
| 4,099,694 | A | | 7/1978 | Horwitz ...................... 248/339 |
| 4,127,252 | A | | 11/1978 | Splawn ........................ 248/333 |
| 4,575,295 | A | * | 3/1986 | Rebentisch .................. 411/85 |
| 4,805,855 | A | | 2/1989 | Kirby .......................... 248/58 |
| 4,993,676 | A | | 2/1991 | Fitts et al. ................... 248/317 |
| 5,154,579 | A | | 10/1992 | Rezek ........................... 416/5 |
| 5,259,165 | A | * | 11/1993 | Koyama .................. 52/506.06 |
| 5,351,926 | A | | 10/1994 | Moses ...................... 248/354.5 |
| 5,937,073 | A | | 8/1999 | Van Gleson ................. 381/391 |
| 6,452,095 | B1 | * | 9/2002 | Perrault .................... 174/40 R |
| 6,609,343 | B1 | | 8/2003 | Litten ........................ 52/653.2 |
| 2003/0182893 | A1 | * | 10/2003 | Poldmaa .................. 52/745.21 |
| 2005/0252135 | A1 | * | 11/2005 | Hartwick ................. 52/506.06 |
| 2006/0254190 | A1 | | 11/2006 | Hunt |

FOREIGN PATENT DOCUMENTS

| | | |
|---|---|---|
| DE | 19734629 A1 * | 9/1998 |
| EP | 1061277 A2 * | 12/2000 |

OTHER PUBLICATIONS

Notice of References Cited in Office Action dated Sep. 13, 2007 for U.S. Appl. No. 10/641,603.

* cited by examiner

INDUSTRIAL HANGER FOR METAL FRAMING

This patent application is a continuation-in-part application of U.S. patent application Ser. No. 10/641,603 entitled "Industrial Hanger" filed on Aug. 15, 2003.

1. FIELD OF THE INVENTION

The present invention relates to industrial hangers for metal framing.

2. BACKGROUND

Figure 1:
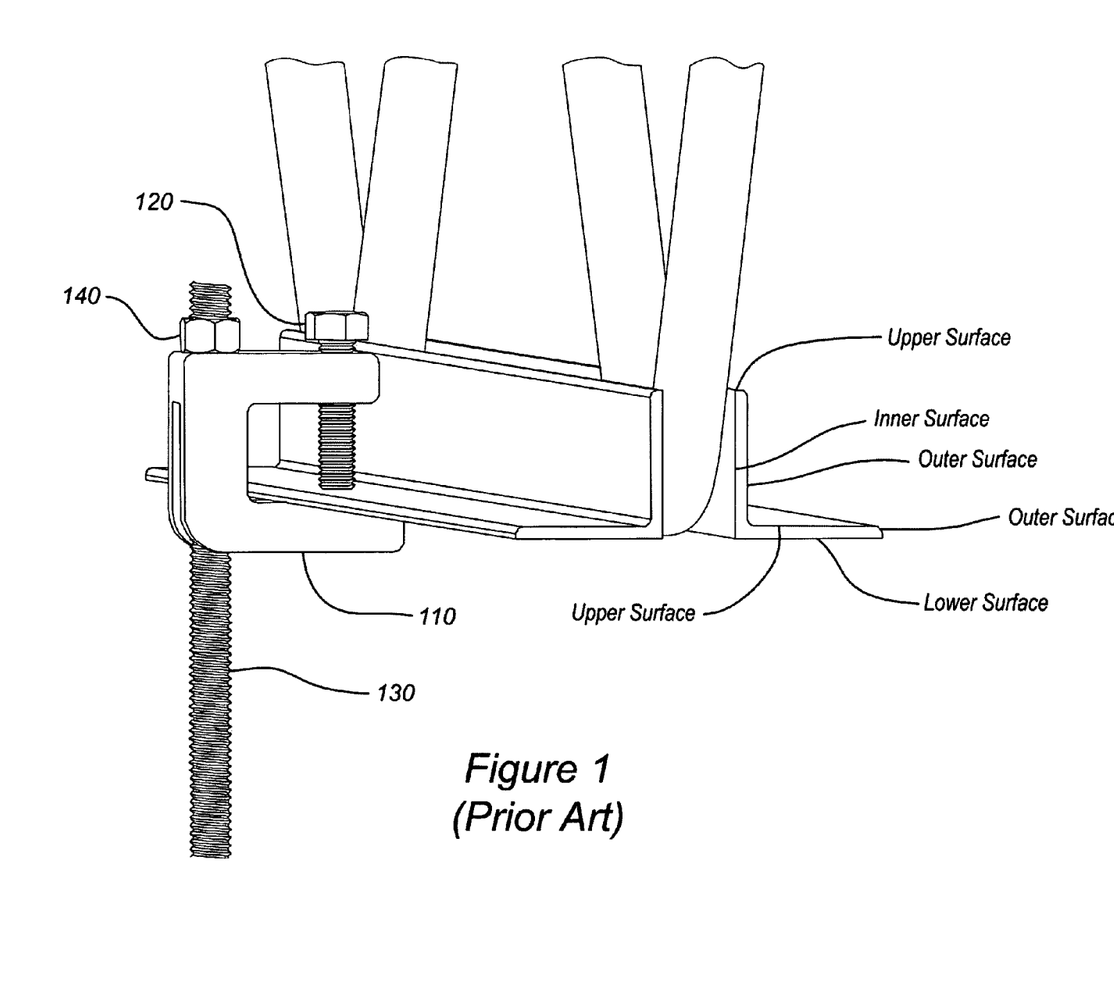
FIG. 1 presents a prior art industrial hanger assembly.

Many industrial buildings, such as warehouses, utilize trusses to support the roof of the buildings. The trusses are also utilized to support electrical lights, electrical conduits, and pipes of various sizes. Some of these trusses include two angle irons. As shown in FIG. 1, these angle irons each typically include two upper surfaces, a lower surface, an inner surface, and two outer surfaces. The inner surfaces of the two angle irons are attached to the webbing of the truss. As a result, along the inner surfaces of the two angle irons a number of gaps are formed.

One prior art industrial hanger assembly is shown in FIG. 1. As shown in FIG. 1, the prior art hanger 110 is clamped to a lower surface of an angle iron of a truss by a bolt 120. The prior art hanger 110 also supports an all-thread rod 130. The height of the all-thread rod 130 is adjusted by setting the position of a nut 140 with respect to the all-thread rod 130. Items such as conduit hangers are then attached to the all-thread rod 130.

One disadvantage of the above industrial hanger assembly is that the industrial hanger cannot be readily installed from the floor of an industrial building. Instead, the installer typically elevates himself, via a lift or a ladder, to the height of the truss so that he can manipulate the bolt 120 and install the prior art hanger. Sometimes obstructions, such as large electrical equipment, do not permit an installer to be readily elevated so that he can install the prior art hanger 110. In addition, hanger installation time would be reduced and safety would be enhanced if the installer could install an industrial hanger from the floor of an industrial building. Thus, a need exists for an industrial hanger that can be readily installed from the floor of an industrial building.

3. SUMMARY OF THE INVENTION

One embodiment of the invention is a hanger assembly for attaching to framing. The framing has a first vertical wall and a second vertical wall. The framing also has a top and a bottom. The framing has two bearing surfaces that form a plane that is located between the top of the framing and the bottom of the framing. The two bearing surfaces form a slot that allows access to the interior of the framing. The hanger assembly includes a nut that engages the two bearing surfaces of the framing. The nut has a first thread. The hanger assembly also includes a threaded rod that contains a second thread that engages the first thread. The hanger assembly also includes a coupler that contains a third thread that engages the second thread. The distance between the nut and the coupling changes when the coupling is rotated with respect to the nut.

5. DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 One Embodiment of an Industrial Hanger Assembly

Figure 2:
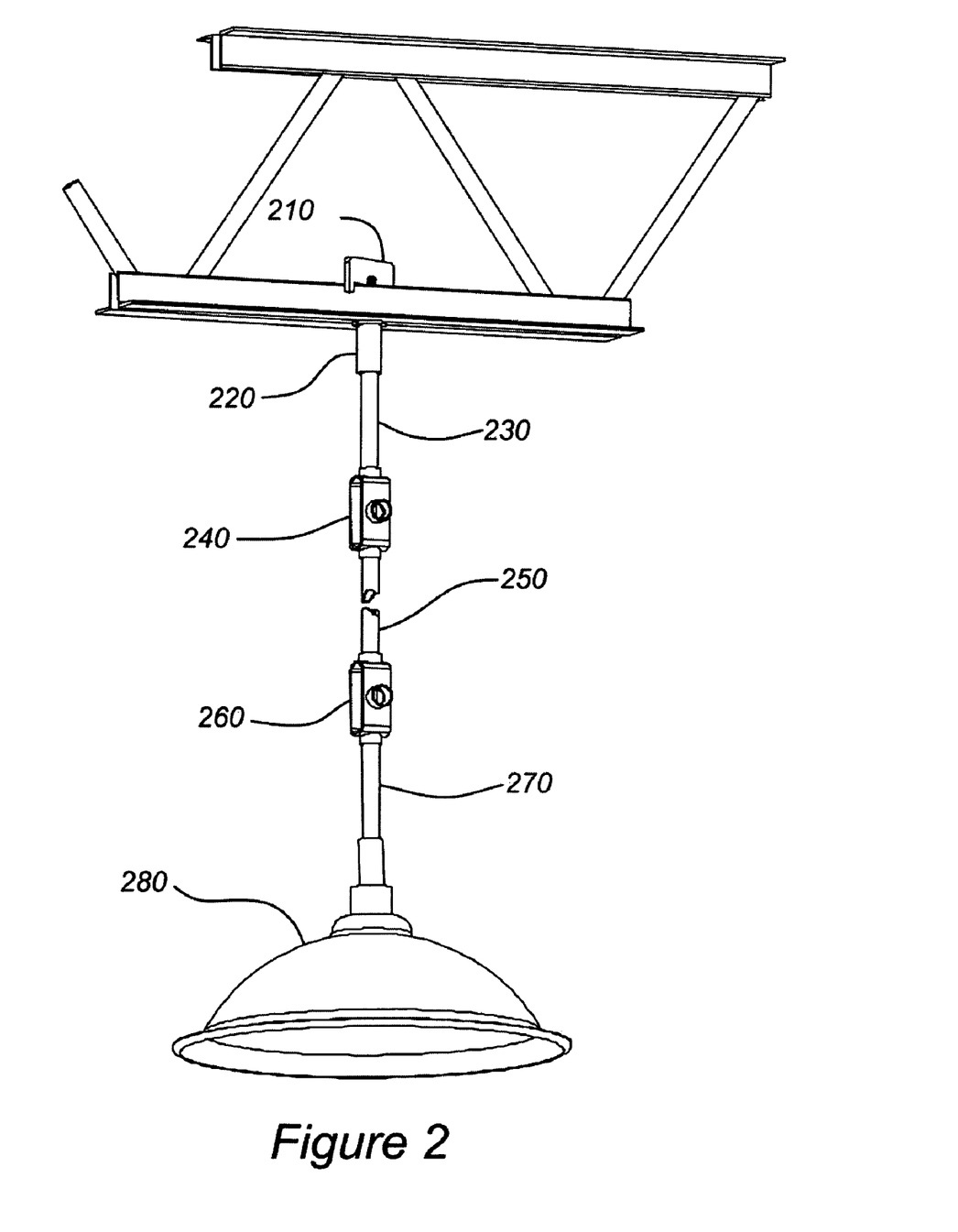
FIG. 2 presents an industrial hanger assembly.
Figure 3:
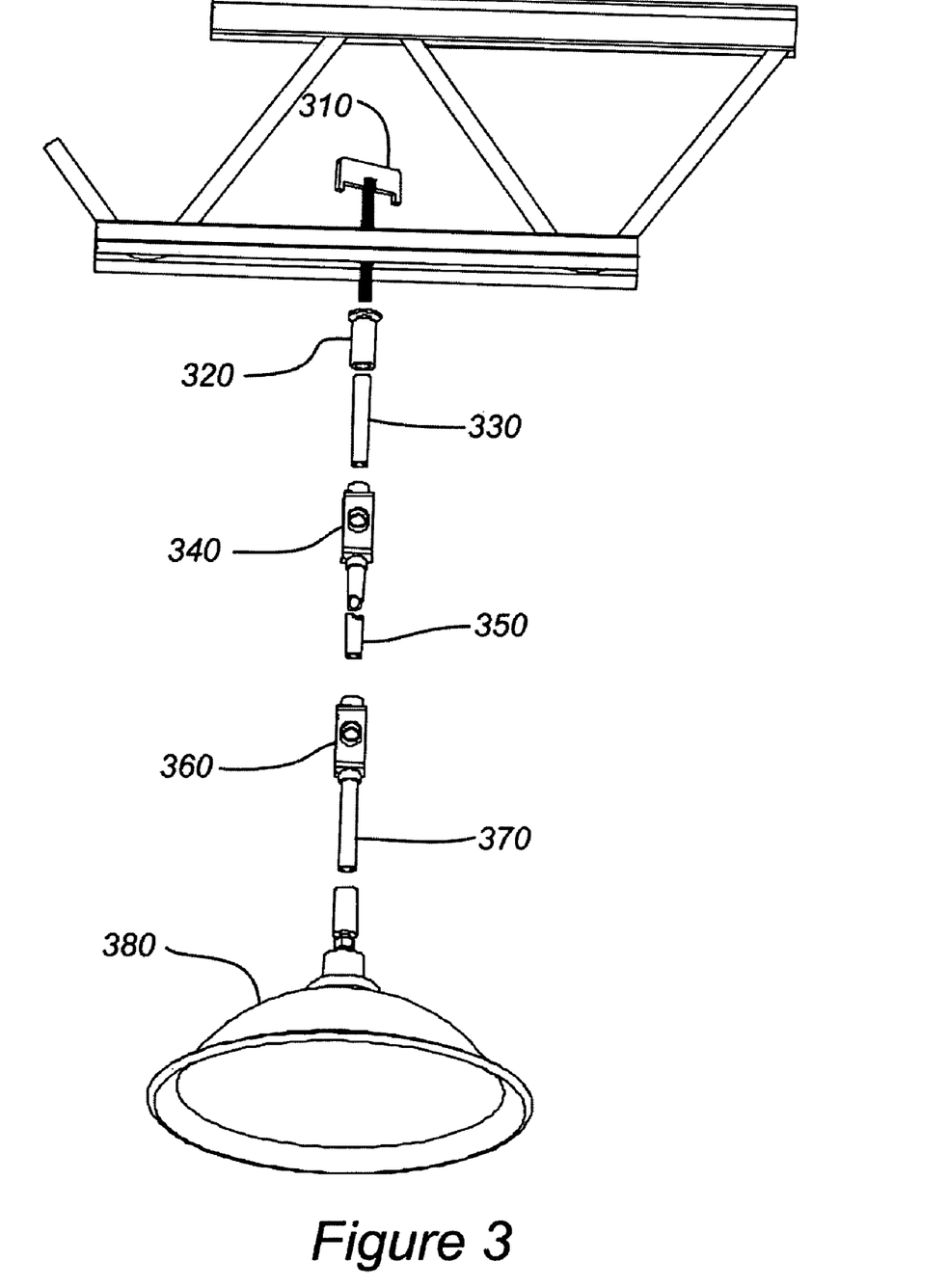
FIG. 3 presents an exploded view of the industrial hanger assembly of FIG. 2.

One embodiment of the invention is the industrial hanger assembly shown in FIG. 2. An exploded view of this industrial hanger assembly is shown in FIG. 3. As shown in FIG. 2, the industrial hanger assembly includes a T-bar assembly 210. A more detailed drawing of the T-bar assembly 210 is shown in FIG. 4.

Figure 4:
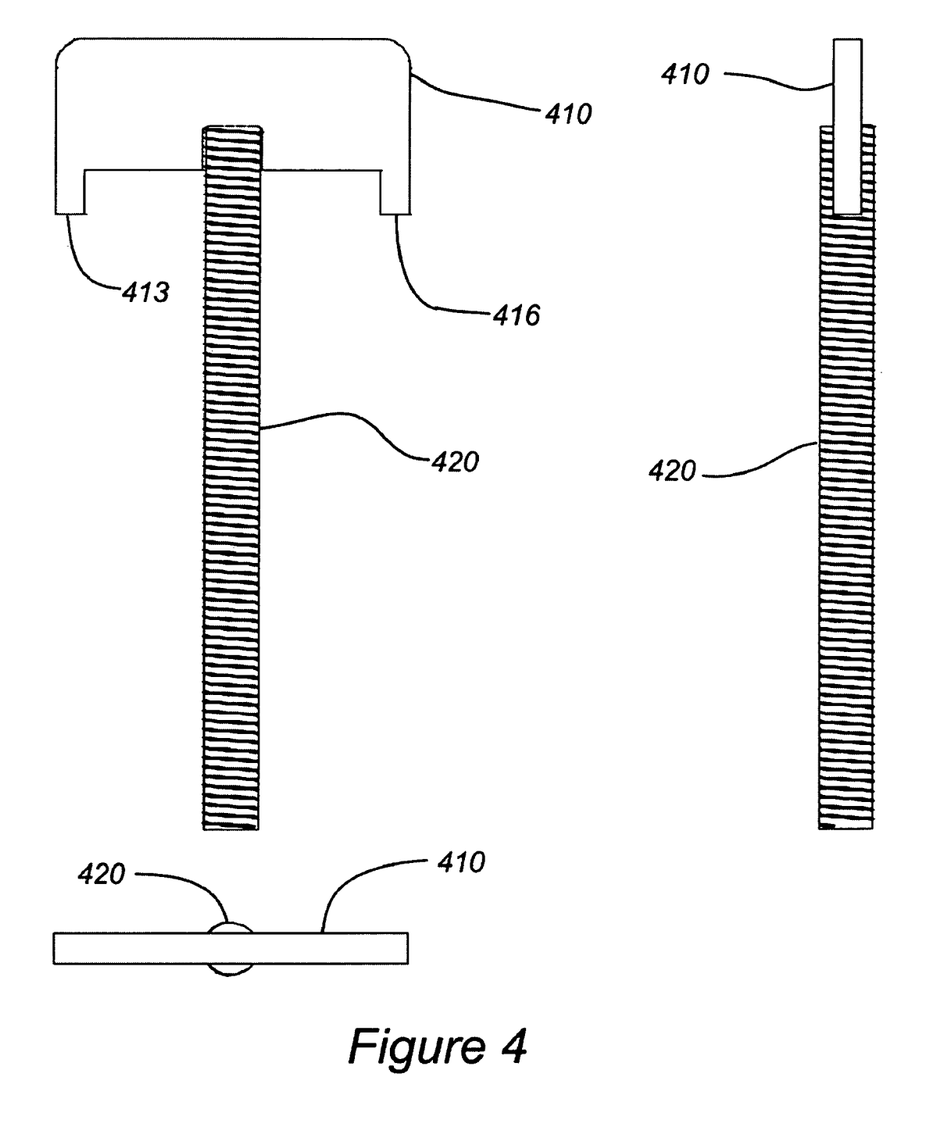
FIG. 4 presents a detailed view of a T-bar assembly.

As shown in FIG. 4, one embodiment of the T-bar assembly includes a T-bar 410. In some embodiments of the invention, the T-bar 410 contains two tabs 413 and 416. The two tabs 413 and 416 are typically configured so that they can engage the outer vertical surfaces of the lower angle irons of a truss. As a result, the two tabs 413 and 416 can rotationally restrain the T-bar assembly with respect to a truss, such as the truss shown in FIG. 2. The thickness of the T-bar 410 is typically configured so that the T-bar 410 can fit between the inner vertical surfaces of the lower angle irons in a truss. The T-bar 410 can be formed from a number of materials. For example, the T-bar 410 could be formed from steel, aluminum, nylon, or plastic.

The T-bar assembly shown in FIG. 4 also includes a threaded rod 420. In some embodiments of the invention, the threaded rod 420 is a low carbon steel all-thread rod. In some embodiments of the invention, the threaded rod 420 includes an ANSI thread while in other embodiments of the invention the threaded rod 420 includes a metric thread. The threaded rod 420 is configured so that it can fit between the inner vertical surfaces of the lower angle irons in a truss. Like the T-bar 410, the threaded rod 420 can be formed from a number of materials such as steel, aluminum, nylon, or plastic.

As shown in FIG. 4, the threaded rod 420 is attached to the T-bar 410. For example, if the T-bar 410 is formed from a steel plate and contains a cutout and the threaded rod 420 is formed from steel, then they could be attached by welds (not shown). Alternatively, if the threaded rod 420 is slotted to accept a portion of the T-bar 410, the T-bar 410 and the threaded rod 420 could be attached by a fastener, such as a bolt, screw or pin (not shown). If the T-bar 410 and the threaded rod 420 are both formed from plastic, then they could be molded as a single part.

Referring again to FIG. 2, the industrial hanger assembly includes a T-bar coupling 220. The top portion of the T-bar coupling 220 contains a thread that engages the thread on the T-bar assembly 210. Thus, by rotating the T-bar coupling 220 with respect to the T-bar assembly 210, the distance between the two parts can be easily increased or decreased. The outer diameter of the top portion of the T-bar coupling 220 is typically of sufficient size so that it will not fit between the inner vertical surfaces of the lower angle irons in a truss. For example, the outer diameter of the top portion of the T-bar coupling 220 may be 1 inch. The lower portion of the T-bar coupling 220 is adapted to interface with conventional items that are typically hung from trusses. The lower portion of the T-bar coupling 220 may interface with pipes, electrical junction boxes, lighting fixtures, conduit hangers, etc. As an example, the lower portion of the T-bar coupling 220 shown in FIG. 2 includes pipe threads that can interface with a pipe.

Referring again to FIG. 2, the industrial hanger assembly also includes conventional pipes 230, 250, and 270, conventional electrical junction boxes 240 and 260, and a lighting fixture 280.

5.2 A Method of Installing an Industrial Hanger Assembly

There are several methods of attaching the industrial hanger assembly shown in FIG. 3 to a truss. One method of attaching the industrial hanger assembly is presented in FIG. 5. First, as shown in Block 510, the lighting fixture 380 is conventionally attached to a first pipe 370. Next, as shown in Block 520 the first pipe 370 is then conventionally attached to a first electrical junction box 360. Then, as shown in Block 530, the first electrical junction box 360 is conventionally attached to a second pipe 350. As shown in Block 540, the second pipe 350 is then conventionally attached to a second electrical junction box 340. Next, as shown in Block 550, the second electrical junction box 340 is conventionally attached to a third pipe 330. Then, as shown in Block 560, the third pipe 330 is connected to a T-bar coupling 320 by engaging the pipe thread on the lower portion of the T-bar coupling 320 with the pipe thread on the upper portion of the third pipe 330 and then rotating the T-bar coupling 320 with respect to the third pipe 330. Next, as shown in Block 570, the thread of the T-bar assembly 310 is connected to the T-bar coupling 320 by engaging the threads of the two parts and by rotating the T-bar assembly 310 with respect to the T-bar coupling 320. After a few rotations of the T-bar assembly 310, the T-bar assembly 310 will be attached to the T-bar coupling 320. However, the vertical distance between the top surface of the T-bar coupling 320, and the tabs of the T-bar assembly 310 will be greater than the height of the angle irons in the lower portion of the truss. The series of pipe, junction boxes, and couplings form a long handle or stem with which the T-bar assembly can be raised and mounted on the truss without the user having to be elevated or raised. As is clear, the stem or handle may also be formed with only the pipes and couplers as well.

Figure 5:
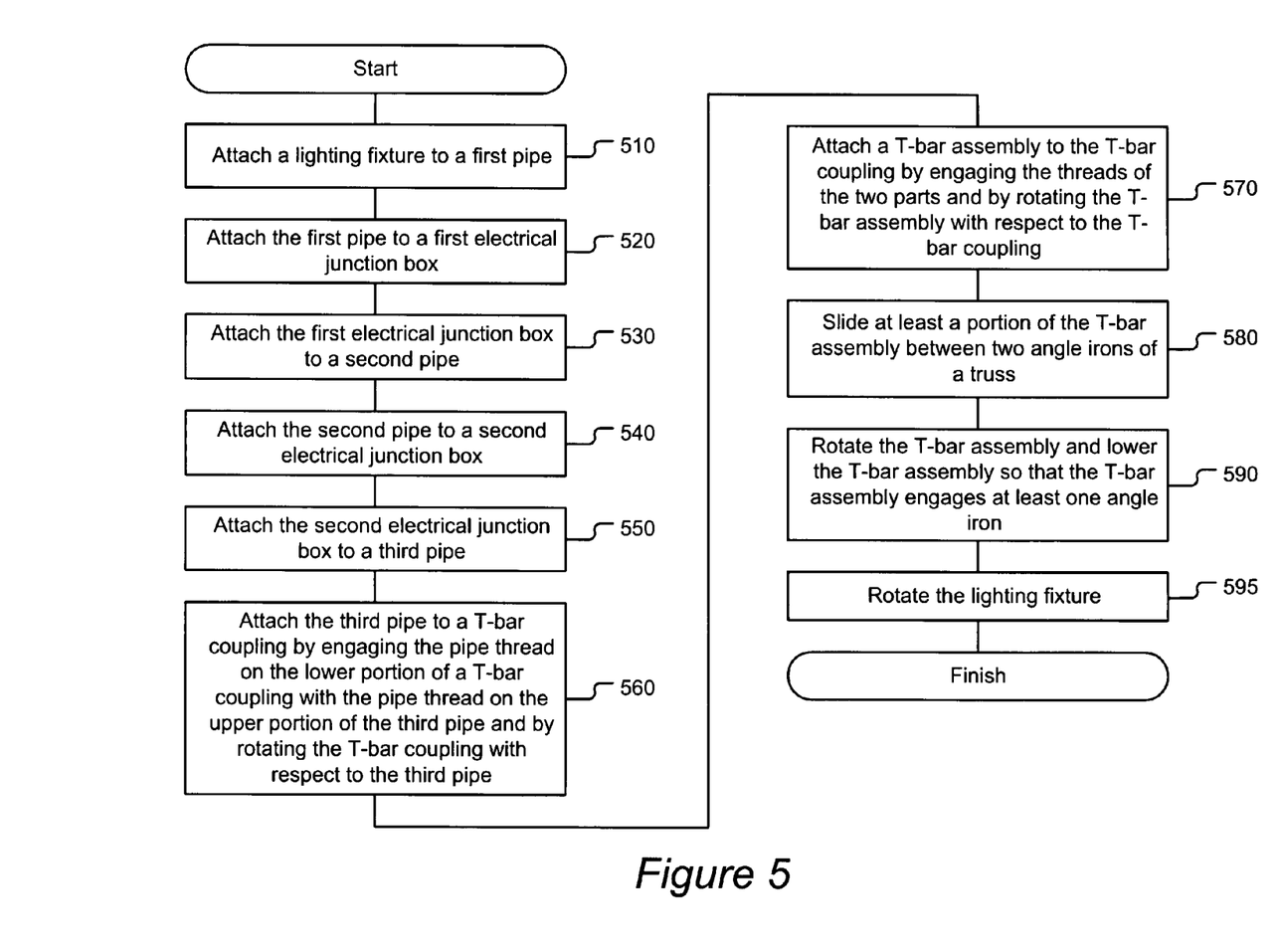
FIG. 5 presents a method of installing a hanger assembly onto a truss.

Next, as shown in Block 580, the industrial hanger assembly is positioned so that at least a portion of the T-bar assembly 310 slides between the two angle irons in the lower portion of the truss. Then, as shown in Block 590, the T-bar assembly 310 is rotated approximately 90 degrees, which can be accomplished by rotating the lighting fixture 380 by 90 degrees. Next, as also shown in Block 590, the industrial hanger assembly is lowered so that the T-bar of the T-bar assembly 310 engages the top surfaces of the angle irons in the lower portion of the truss. Then, as shown in Block 595, the lighting fixture 380 is rotated. This rotation causes the T-bar assembly 310 to rotate until at least one of the tabs of the T-bar assembly 310 engages the outer surfaces of at least one of the lower angle irons in the lower portion of the truss. As the lighting fixture 380 is continually rotated, the T-bar coupling 320 will increase in height until the upper surface of the T-bar coupling 320 engages the lower surface of at least one of the angle irons that form the lower portion of the truss. At this time, the industrial hanger assembly is securely attached to the truss.

As is evident in the above description, a stem or handle is formed which allows an installer can safely install the industrial hanger assembly shown in FIG. 3 without having to be elevated to the height of the truss.

5.3 A Second Embodiment of an Industrial Hanger Assembly

Figure 6:
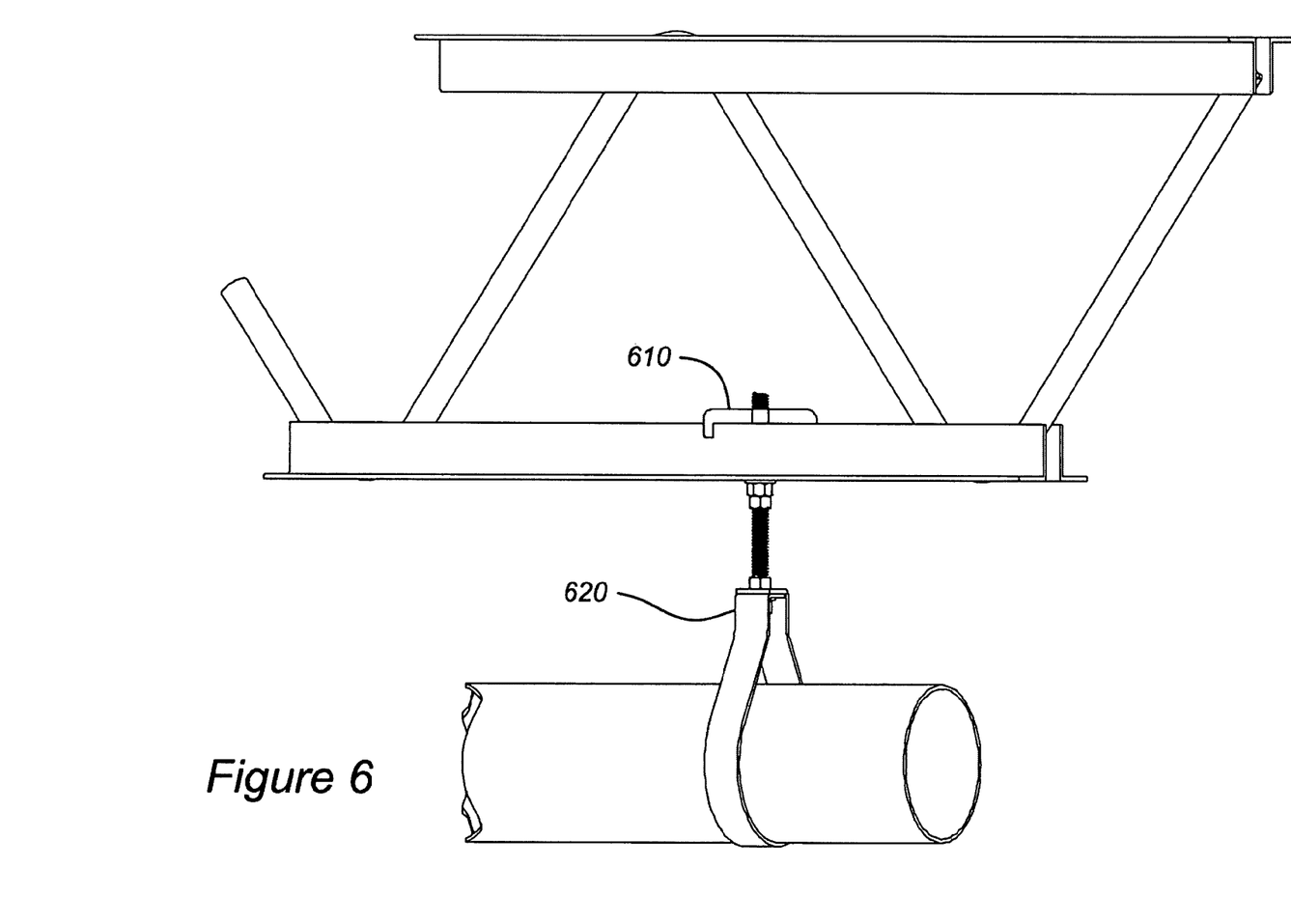
FIG. 6 presents another hanger assembly.

A second embodiment of an industrial hanger assembly is shown in FIG. 6. This industrial hanger assembly includes a T-bar assembly 610. A more detailed drawing of T-bar assembly 610 is shown in FIG. 7.

Figure 7:
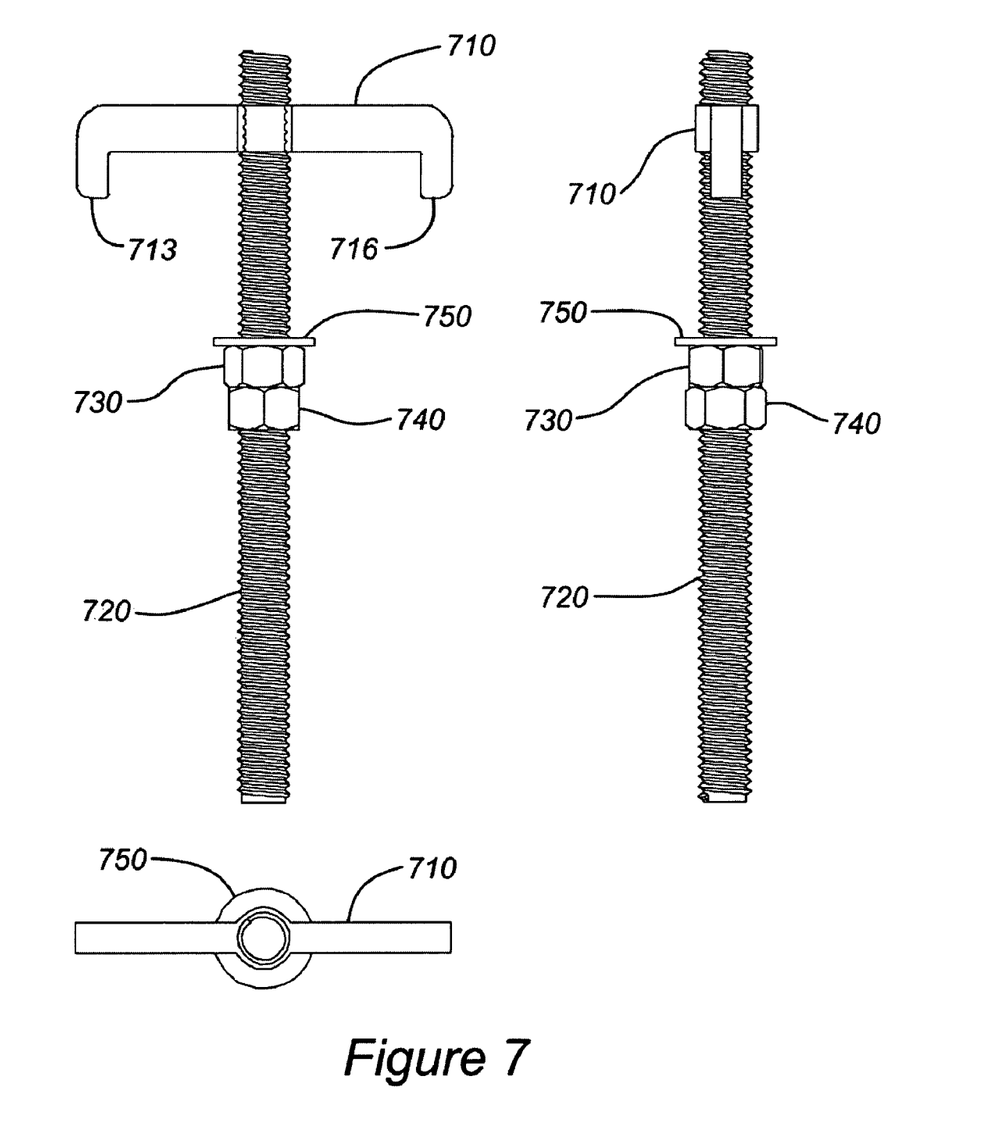
FIG. 7 presents another T-bar assembly.

As shown in FIG. 7, one embodiment of the T-bar assembly includes a T-bar 710. In some embodiments of the invention, the T-bar 710 includes two tabs, 713 and 716. The two tabs 713 and 716 are typically configured so that they can engage the outer vertical surfaces of the lower angle irons of a truss. As a result, the two tabs 713 and 716 can rotationally restrain the T-bar with respect to a truss, such as the truss shown in FIG. 6. The thickness of the T-bar 710 is typically configured so that the T-bar 710 can fit between the inner vertical surfaces of the lower angle irons in a truss. The T-bar 710 shown in FIG. 7 contains a thread that is intended to interface with an all-thread rod 720. This thread can be ANSI or metric or any other suitable thread. The T-bar 710 can be formed from a number of materials. For example, the T-bar 710 could be formed from steel, aluminum, nylon, or plastic.

The T-bar assembly shown in FIG. 7 also includes a threaded rod 720. In some embodiments of the invention, the threaded rod 720 is a low carbon steel all-thread rod. In some embodiments of the invention, the threaded rod 720 includes an ANSI thread while in other embodiments of the invention the threaded rod 720 includes a metric thread. The threaded rod 720 is configured so that it can fit between the inner vertical surfaces of the lower angle irons in a truss. Like the T-bar 710, the threaded rod 720 can be formed from a number of materials such as steel, aluminum, nylon, or plastic.

As shown in FIG. 7, the all-thread rod 720 can be attached to the T-bar 710 by engaging the threads of the two parts and by rotating the T-bar 710 with respect to the all-thread rod 720.

The T-bar assembly shown in FIG. 7 also includes two nuts 730 and 740 and a washer 750. The two nuts 730 and 740 may be utilized to set the lowermost position of the washer 750, which in some embodiments of the invention is a lock-washer, with respect to the all-thread rod 720. Other embodiments of the T-bar assembly can utilize a single nut that is restrained from rotating with respect to the all-thread rod, such as by a weld or by lock-tight. Still other embodiments of the T-bar assembly secure the lowermost position of the washer 750 by welding the washer to the all-thread rod. The washer 750 is typically of sufficient size so that it will not fit between the inner vertical surfaces of the lower angle irons in a truss.

Referring again to FIG. 6, the T-bar assembly 610 is attached to a pipe hanger 620. The pipe hanger 620 can be attached to the T-bar assembly 610 by using conventional methods such as nuts, as shown in FIG. 6.

5.4 A Second Method of Installing an Industrial Hanger Assembly

Figure 8:
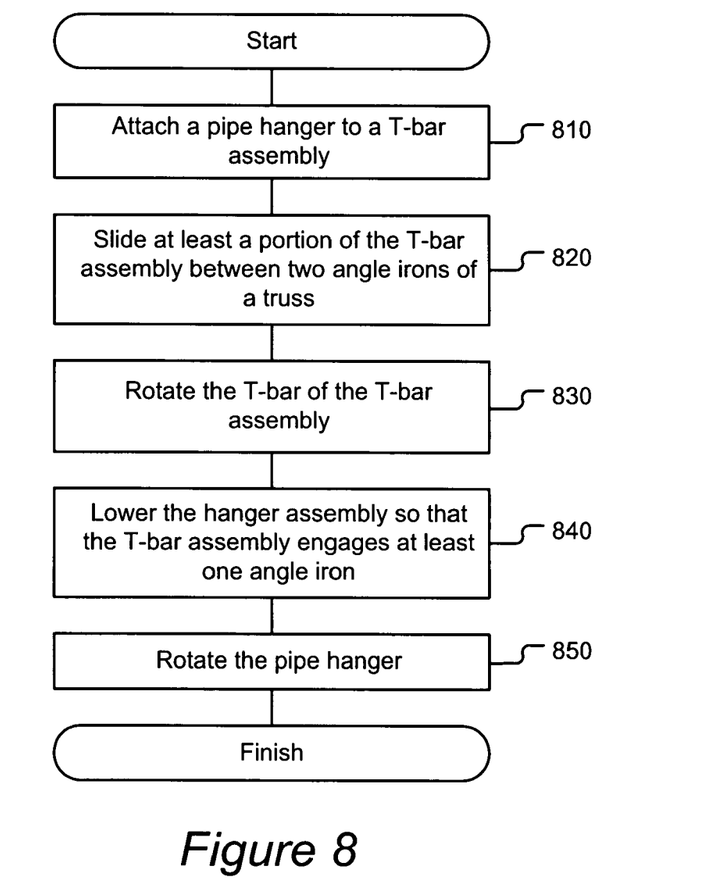
FIG. 8 presents another method of installing a hanger assembly onto a truss.

There are several methods of attaching the industrial hanger assembly shown in FIG. 6 to a truss. One method of attaching the industrial hanger assembly is presented in FIG. 8. First, as shown in Block 810, the pipe hanger 620 is attached to the T-bar assembly 610. For example, two nuts could be utilized to attach the pipe hanger 620 to the T-bar assembly 610. Next, as shown in Block 820, the industrial hanger assembly is positioned so that at least a portion of the T-bar assembly is positioned so that at least a portion of the T-bar assembly 610 slides between the tow angle irons in the lower portion of the truss. Then as shown in Block 830, the T-bar of the T-bar assembly 610 is rotated approximately 90 degrees, which can be accomplished by rotating the pipe hanger 620 by 90 degrees. Next, as is shown in Block 840, the industrial hanger assembly is lowered so that the T-bar of the T-bar assembly 610 engages the top surfaces of the angle irons in the lower portion of the truss. Then, as shown in Block 850, the pipe hanger 620 is rotated. This rotation causes the T-bar of the T-bar assembly 610 to rotate until at least one of the tabs of the T-bar assembly 610 engages the outer surfaces of at least one of the lower angle irons in the lower portion of the truss. As the pipe hanger 620 is continually rotated, the all-thread rod of the T-bar assembly 610 will continue to rotate but the T-bar of the T-bar assembly 610 will not rotate because one or more tabs of the T-bar assembly 610 are in contact with the truss. Thus, the all-thread rod will increase in height until the washer of the T-bar assembly 610 contacts the lower surface of at least one angle iron of the truss. At this time, the industrial hanger assembly is securely attached to the truss. In this embodiment, the threaded rod forms an elongated handle or stem with which the hanger assembly may be raised to the height of the truss.

As is evident in the above description, an installer can safely install the hanger assembly shown in FIG. 6 without having to be elevated to the height of the truss.

5.5 A Third Embodiment of an Industrial Hanger Assembly

Figure 9:
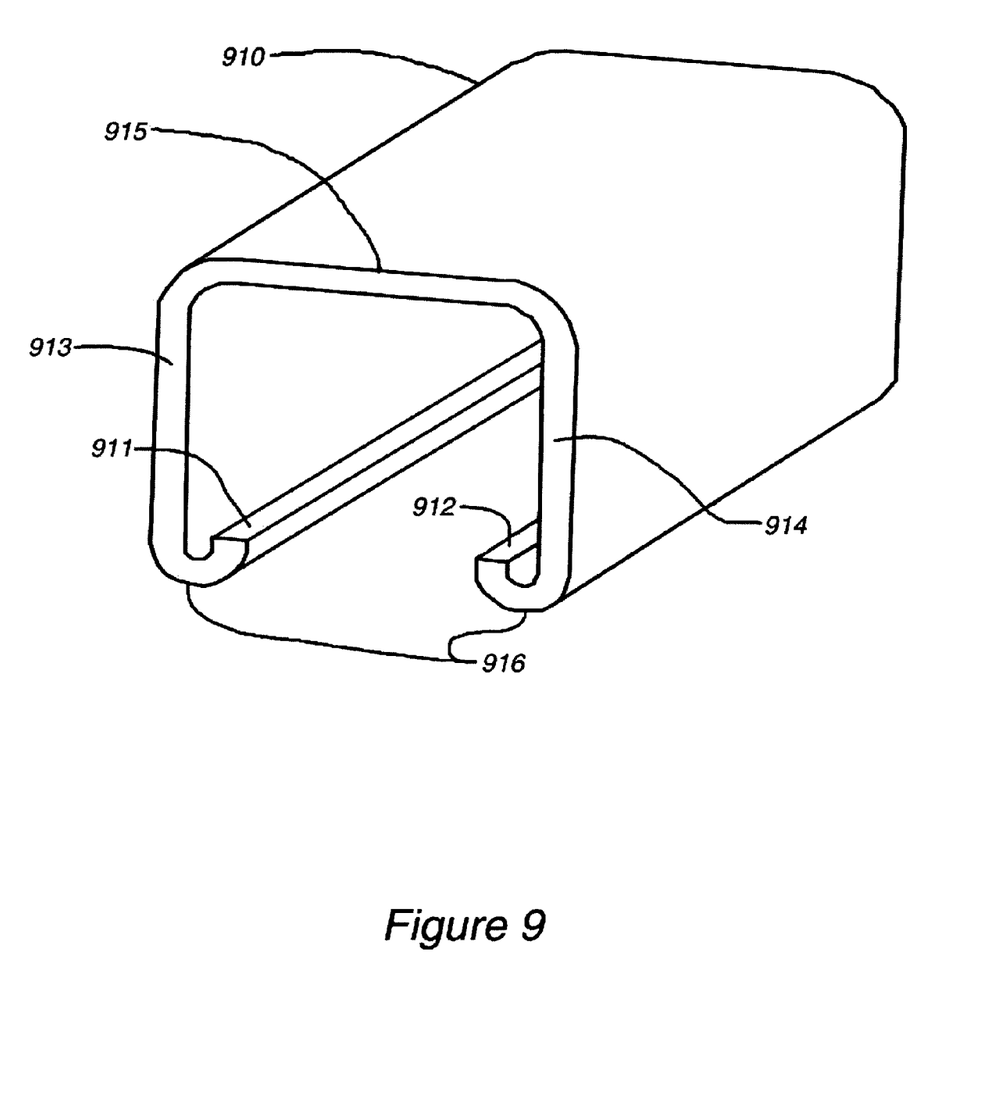
FIG. 9 presents a diagram of framing.

Trusses, such as those shown in FIG. 1, are often utilized to support structural framing. For example, such trusses commonly support UNISTRUT.RTM. strut-type metal framing channel FIG. 9 presents a section of UNISTRUT.RTM. strut-type metal framing channel framing 910. As can be seen in FIG. 9, UNISTRUT.RTM. strut-type metal framing channel framing 910 includes two bearing surfaces 911 and 912. The bearing surfaces 911 and 912 can support light loads, such as the weight of light fixtures.

As shown in FIG. 9, bearing surfaces 911 and 912 are located between the vertical walls 913 and 914 of UNISTRUT.RTM. strut-type metal framing channel 910. In addition, as shown in FIG. 9, bearing surfaces 911 and 912 form a plane that is located between the top 915 and bottom 916 of UNISTRUT.RTM. strut-type metal framing channel 910. This plane is co-planer with the top 915 of UNISTRUT.RTM. strut-type metal framing channel 910.

Prior hanger systems that connect UNISTRUT.RTM. strut-type metal framing channel 910 to pipes require an installer to elevate himself, via a lift or a ladder, to the height of the framing. Sometimes, due to obstructions such as large electrical equipment, an installer can not be readily elevated so that he can install a hanger to UNISTRUT.RTM. strut-type metal framing channel 910. Thus, a need exists for an industrial hanger assembly that can be readily installed from the floor of an industrial building. A view of such a hanger assembly is presented in FIG. 10.

Figure 10:
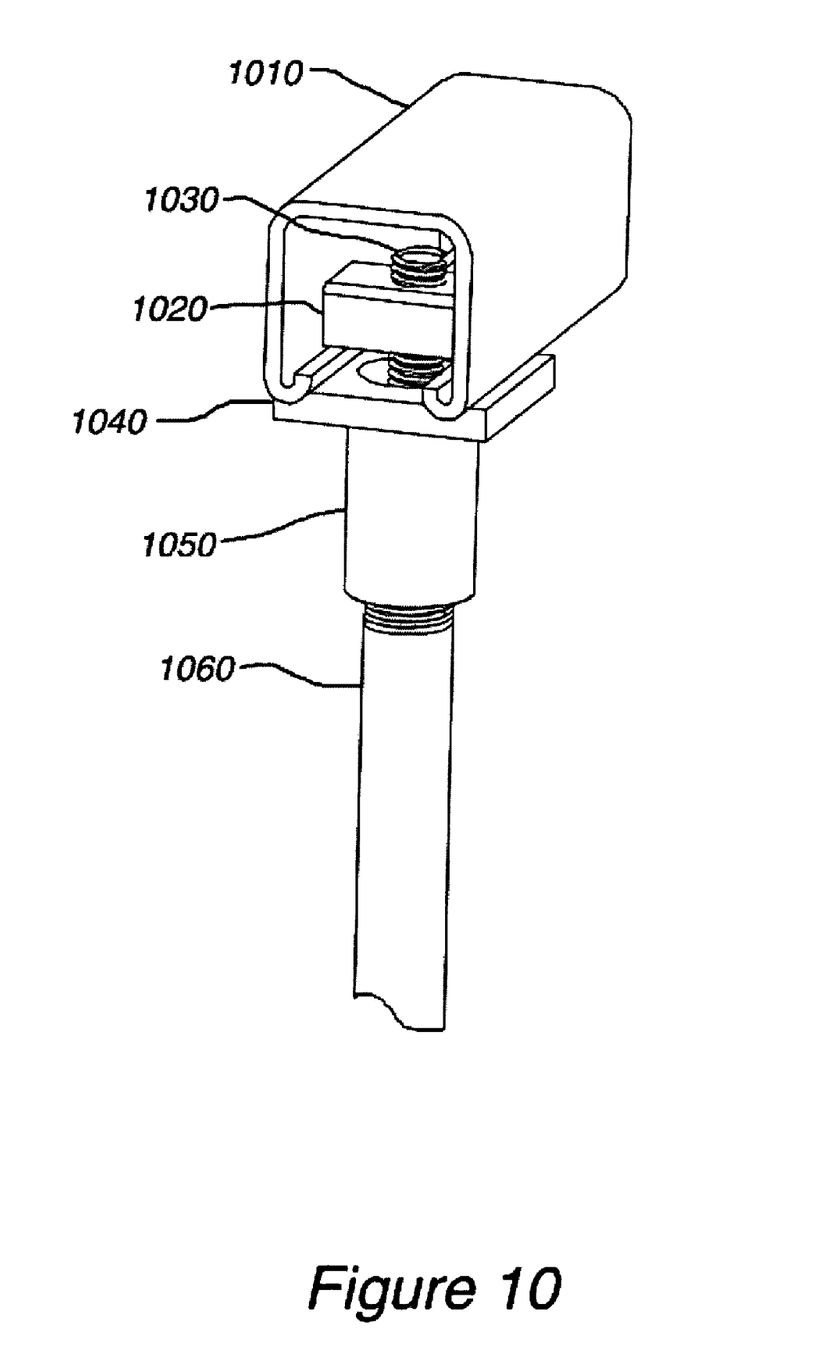
FIG. 10 presents a hanger assembly for the framing of FIG. 9.

The hanger assembly of FIG. 10 includes a nut 1020, such as a UNISTRUT.RTM. strut-type metal framing channel nut. The nut 1020 contacts the bearing surfaces of UNISTRUT.RTM. strut-type metal framing channel 1010. In some embodiments of the invention, the nut 1020 includes a spring (not shown) that interfaces with the inner surface of the top wall of UNISTRUT.RTM. strut-type metal framing channel 1010. The spring would apply a force on the nut 1020 that would cause the nut 1020 to contact the bearing surfaces of UNISTRUT.RTM. strut-type metal framing channel 1010. Some embodiments of the invention, such as shown in FIG. 10, utilize a nut that has a thickness that is less than the width of the slot formed by the two bearing surfaces. In such embodiments of the invention, the nut, when properly positioned, can be inserted into the interior of the framing by passing the nut through the framing's slot.

As shown in FIG. 10, a washer 1040 contacts the bottom of UNISTRUT.RTM. strut-type metal framing channel 1010. The washer 1040 is typically sized so that it is wider than the UNISTRUT.RTM. strut-type metal framing channel 1010. Thus, the washer 1040 will not enter the slot formed by the inner edges of the framing's bearing surfaces.

The threaded rod 1030 also engages an internal thread on the coupler 1050. The coupler is typically sized so that the outer diameter of the coupler 1050 is larger than the inner diameter of the washer 1040. In some embodiments of the invention, the coupler 1050 is made of steel. In other embodiments of the invention, the coupler 1050 is made of plastic. By rotating the coupler 1050 with respect to the nut 1020, the distance between the nut 1020 and the coupler 1050 can be increased or decreased. Thus, by rotating the coupler 1050, the nut 1020, the UNISTRUT.RTM. strut-type metal framing channel 1010, and the washer 1040 can be clamped together via threaded rod 1030.

The hanger assembly shown in FIG. 10 also includes a pipe 1060. The pipe 1060 includes an external thread that interfaces with an internal thread of coupler 1050. The inner diameter of the pipe 1060 is typically larger than the outer diameter of the threaded rod 1030. Thus, the threaded rod 1030 can pass through portions of the pipe 1060.

Figure 11:
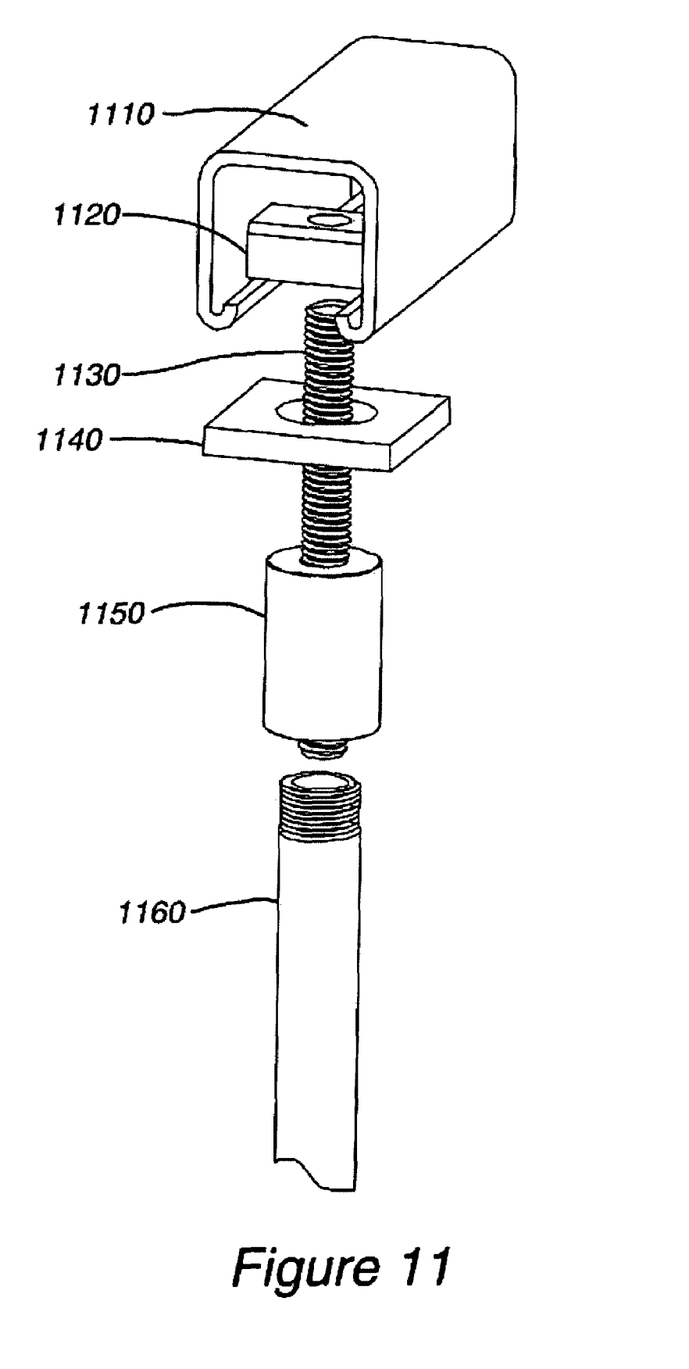
FIG. 11 presents an exploded view of the hanger assembly of FIG. 10.

An exploded view of the hanger assembly of FIG. 10 is shown in FIG. 11.

While the couplers shown in FIGS. 10 and 11 utilize an internal thread to engage an external pipe thread, other embodiments of the invention (not shown) utilize an external thread to engage an internal pipe thread. In addition, other embodiments of the invention do not utilize a washer. For example, the size of the coupler 1150 could be sufficient that it would not fit between the slot formed by the frame's bearing surfaces. In such an embodiment of the invention, the upper surface of the coupler 1150 would contact the bottom of the UNISTRUT.RTM. strut-type metal framing channel 1110. Thus, the coupler 1150 would directly clamp the bottom of the UNISTRUT.RTM. strut-type metal framing channel 1110 (as opposed to indirectly clamping the bottom of the UNISTRUT.RTM. strut-type metal framing channel 1110 via washer 1040 as shown in FIG. 10).

5.6 A Method of Installing an Industrial Hanger Assembly on Framing

There are several methods of attaching the industrial hanger assembly shown in FIGS. 10 and 11 to framing. One method of attaching the industrial hanger assembly to framing is presented in FIG. 12.

Figure 12:
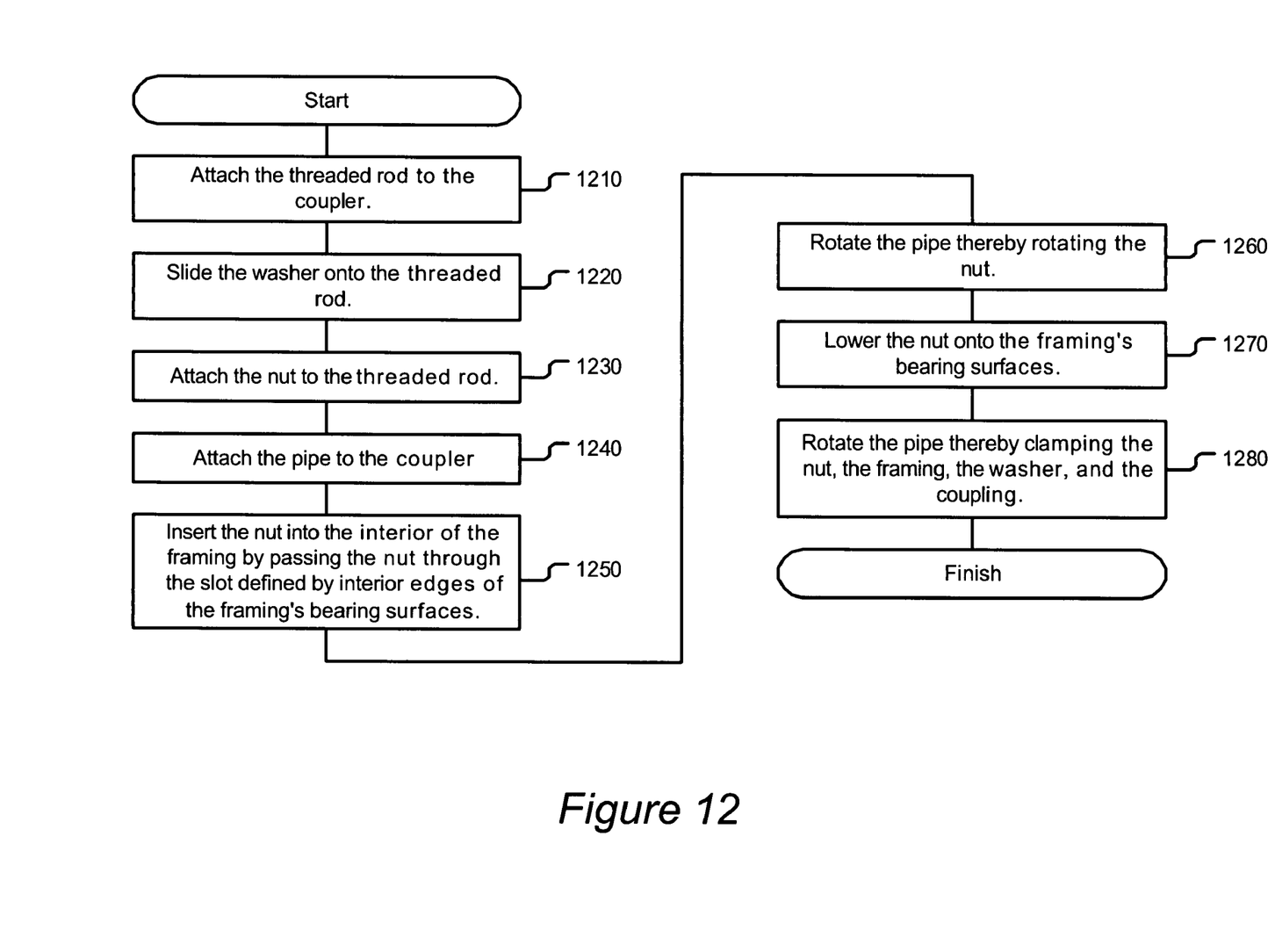
FIG. 12 presents a method of installing the hanger assembly of FIG. 11.

As shown in block 1210, the threaded rod 1130 can first be attached to the coupler 1150 by rotating the threaded rod 1130 with respect to the coupler 1150. Next, as shown in block 1220, the washer 1140 can be slid onto the threaded rod 1130 until the washer 1140 rests on the coupler 1150. Next, as shown in block 1230, the nut 1120 can be attached to the threaded rod 1130 by engaging the thread of the nut 1120 to the thread of the threaded rod 1130. Then, as shown in block 1240, the pipe 1160 can be attached to the coupler 1150 by rotating the pipe 1160 with respect to the coupler 1150.

Next, as shown in block 1250, the hanger assembly can be raised by an installer, while the installer is located safely on the floor of a building, so that the nut 1120 is inserted into the interior of the framing. For example, the nut 1120 can be inserted into the interior of the framing by passing the nut through the slot that is defined by the interior edges of the framing's bearing surfaces. Then, as shown in block 1260, the pipe 1160 can be rotated approximately 90 degrees. When the pipe 1160 is rotated, the coupler 1150, the washer 1140, the threaded rod 1130, and the nut 1120 are also rotated. Thus, the nut 1120 would be rotated so that portions of the nut 1120 would be over the frame's bearing surfaces. Next, as shown in block 1270, the hanger assembly can be lowered so that the nut 1120 would be lowered onto the frame's bearing surfaces. Finally, the pipe can be rotated so that the nut 1120, the framing 1110, the washer 1140 and the coupler 1150 would be clamped together.

All of the above acts could be accomplished while the installer remained on a building floor, due to the elongated handle formed by any one of, or combination of, threaded rod, pipes and couplers and the novel manner in which the T-bar assembly is mounted to the truss. Thus, the acts could be safely and rapidly accomplished.

While the above acts are discussed in a particular sequence, other sequences of the above-discussed acts are contemplated. For example, the pipe 1160 could be coupled to the coupler 1150 before the threaded rod 1130 is threaded into the coupler 1150.

Other methods could also be utilized to install the hanger assembly shown in FIGS. 10 and 11. For example, the nut 1120 could be pre-installed in the framing before the nut 1120 is threaded onto the threaded rod 1130. Then, the threaded rod 1130 could be threaded into the nut 1120 while the installer was safely on the floor.

5.7 Conclusion

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

It is claimed:

1. A hanger assembly for attaching to an associated framing, the associated framing having a first vertical wall and a second vertical wall, the associated framing having a top and a bottom, the associated framing having two bearing surfaces that form a plane that is located between the top of the associated framing and the bottom of the associated framing, the two bearing surfaces forming a slot that allows access to the interior of the associated framing, the slot having a width, the hanger assembly comprising:
   a) a nut configured to engage the two bearing surfaces of the associated framing, the nut having a first thread;
   b) a threaded rod containing a second thread that engages the first thread;
   c) a coupler containing a third thread that engages the second thread wherein the distance between the nut and the coupler changes when the coupler is rotated with respect to the nut, the coupler further including a fourth thread that is an internal thread; and
   d) a pipe that includes a fifth thread, the fifth thread being an external thread, the fifth thread engaging the fourth thread, the pipe having in inside diameter sufficiently large to accommodate the threaded rod without engagement of the second thread with an interior of the pipe, the threaded rod and the pipe forming a stem, the stem having a length wherein the length of the stem allows mounting of the hanger assembly from a floor or platform without a user having to be elevated.

2. The hanger assembly of claim 1 wherein the nut is configured for use with a strut-type metal framing channel.

3. The hanger assembly of claim 1 wherein the nut has a thickness that is less than the width of the slot.

4. The hanger assembly of claim 1, wherein the threaded rod is a low carbon steel rod.

5. The hanger assembly of claim 1, wherein the threaded rod is an all-thread rod.

6. The hanger assembly of claim 1, further including a washer, the washer contacting the bottom of the associated framing.

* * * * *

UNITED STATES PATENT AND TRADEMARK OFFICE
CERTIFICATE OF CORRECTION

PATENT NO. : 7,410,141 B2
APPLICATION NO. : 10/974043
DATED : August 12, 2008
INVENTOR(S) : Sam K. Hartwick

It is certified that error appears in the above-identified patent and that said Letters Patent is hereby corrected as shown below:

On the Title Page,

Item "(73) Assignee: Illinois Tool Works Inc., Glenview, IL (US)" is deleted

Signed and Sealed this

Fourteenth Day of April, 2009

JOHN DOLL
*Acting Director of the United States Patent and Trademark Office*